US012278444B2

(12) United States Patent
Qiu

(10) Patent No.: US 12,278,444 B2
(45) Date of Patent: Apr. 15, 2025

(54) PROTECTION STRUCTURE FOR POWER RECEPTACLE

(71) Applicant: Chengli Li, Suzhou (CN)

(72) Inventor: Shi Qiu, Suzhou (CN)

(73) Assignee: Chengli Li, Suzhou (CN)

( * ) Notice: Subject to any disclaimer, the term of this patent is extended or adjusted under 35 U.S.C. 154(b) by 368 days.

(21) Appl. No.: 18/153,014

(22) Filed: Jan. 11, 2023

(65) Prior Publication Data

US 2024/0195118 A1 Jun. 13, 2024

(30) Foreign Application Priority Data

Dec. 9, 2022 (CN) ......................... 202211578342.2
Dec. 9, 2022 (CN) ......................... 202223325538.9

(51) Int. Cl.
*H01R 13/52* (2006.01)
*H01R 25/00* (2006.01)

(52) U.S. Cl.
CPC ....... *H01R 13/5202* (2013.01); *H01R 13/521* (2013.01); *H01R 13/5213* (2013.01); *H01R 25/006* (2013.01)

(58) Field of Classification Search
None
See application file for complete search history.

(56) References Cited

U.S. PATENT DOCUMENTS 5,234,358 A * 8/1993 Polgar .................. H01R 13/506 439/906
6,309,257 B1 * 10/2001 Huang .................. H05K 5/063 439/731
7,507,120 B1 * 3/2009 Bright ................ H01R 13/6582 439/906
7,810,946 B2 * 10/2010 Jarzac .................. H01R 13/521 362/267
8,113,890 B2 * 2/2012 Duesterhoeft .......... H02S 40/34 439/855
8,162,701 B2 * 4/2012 Lee ...................... H01R 13/652 439/731
10,770,832 B2 * 9/2020 Franke ................. H02G 15/113
2005/0079749 A1 * 4/2005 Schmidt ............. H01R 13/5205 439/275

FOREIGN PATENT DOCUMENTS

KR 200436995 Y1 * 10/2007

* cited by examiner

*Primary Examiner* — Tho D Ta
(74) *Attorney, Agent, or Firm* — Chen Yoshimura LLP

(57) ABSTRACT

A protection structure for waterproof protection of an electrical device, including first and second shells connected to each other forming an outer shell, the first and second shells respectively including first and second reinforcement walls on their inside, and a sealing member disposed between the first and second reinforcement walls to form a waterproof seal between them. The protection structure employs a dual-layer structure, where the outer shell is a first protection layer that protects against high impact, high pressure water flow, and the sealing member with the first and second reinforcement walls form a second protection layer which is tightly waterproof to protect against water droplets, vapor and dust. The first protection layer protects the second protection layer from external impact and prevent it from being deformed, enhancing the overall protection effectiveness. The protection structure is easy to manufacture, low cost and easy to repair, and provide high waterproofness.

11 Claims, 8 Drawing Sheets

PROTECTION STRUCTURE FOR POWER RECEPTACLE

BACKGROUND OF THE INVENTION

Field of the Invention

This invention relates to protection technology for electrical appliances, and in particular, it relates to a protection structure for a power receptacle and power receptacle employing the protection structure.

Description of Related Art

Conventional protection structures for electrical appliances located in outdoor environments, such as outdoor power receptacles, meters, etc., use gels, ultrasonic welded seals, rubber rings for local sealing, etc., to provide waterproof and dustproof protection for the appliances. Gels and ultrasonic welded seals require complex processes, are high cost, and are difficult to repair. Rubber rings for local sealing sometimes cannot meet strict waterproof requirements, and the appliance may suffer damage due to insufficient waterproof and dustproof qualities. In some other current power receptacles, assembled components of the power receptacles are sealed with a potting sealant that fills the spaces where components are connected to each other, to waterproof the receptacle. However, potting sealant may lose its protection effect after long time use, causing the waterproof and dustproof function to decline significantly, making the receptacle potentially unsafe. Moreover, this type of receptacles require additional manufacturing steps, which lowers production efficiency, and are difficult to repair or replace.

SUMMARY

To address the above problems, embodiments of the present invention provide a protection structure for a power receptacle, and a power receptacle employing such protection structure, which can meet high protection requirements and are easier and less costly to manufacture, repair and replace.

To achieve the above objects, the present invention provides a waterproof protection structure, which includes: an outer shell, including a first shell and a second shell connected to each other, wherein the first shell includes a first rib disposed on its inside, and the second shell includes a second rib disposed on its inside; a sealing member, disposed between the first rib and the second rib, configured to form a waterproof seal between the first rib and the second rib; and a third shell, connected to the first shell and the second shell to form a sealed space, wherein the third shell includes a fifth rib disposed on its inside; wherein the first shell further includes a third rib disposed on its inside near the third shell, and the second shell further includes a fourth rib disposed on its inside near the third shell, wherein the sealing member is a three-dimensional structure which includes a first scaling portion and a second sealing portion, wherein the first sealing portion connects the first rib and the second rib in a waterproof connection, the second sealing portion connects the third rib of the first shell and the fifth rib of the third shell in a waterproof connection, and the second sealing portion further connects the fourth rib of the second shell and the fifth rib of the third shell in a waterproof connection.

The protection structure employs a dual-layer structure, where the outer shell is a first protection layer that protects against high impact, high pressure water flow, and the scaling member with the first and second ribs form a second protection layer which is tightly waterproof to protect against water droplets, vapor and dust. The first protection layer protects the second protection layer from external impact and prevent it from being deformed, enhancing the overall protection effectiveness.

In some embodiments, the sealing member is connected to the first rib and/or second rib by mating protruding ridges and grooves.

In some embodiments, the electrical device includes a plurality of electrical conductors for forming electrical connection with an external electrical appliance, wherein the third shell includes a partition structure configured to separate the plurality of electrical conductors from each other.

In some embodiments, the partition structure includes a separation structure and a partition sealing structure, wherein the separation structure forms a plurality of mutually separated cavities, and the partition sealing structure seals the plurality of cavities formed by the separation structure.

In some embodiments, the electrical device is a power receptacle and the plurality of electrical conductors are a plurality of insertion contact plates configured to receive prongs of a plug, and wherein the partition structure is configured to separate the plurality of insertion contact plates from each other.

In some embodiments, the protection structure further includes first and second flip covers respectively connected to the first and second shells by pin connectors.

In some embodiments, the pin connectors include knurled pins.

In some embodiments, the protection structure further includes: at least one push button switch disposed on the outer shell; a silica gel button pad disposed below the push button switch; and a silica gel press plate pressing on the silica gel button pad and tightened by screws to form a waterproof seal for the push button switch.

In another aspect, the present invention provides a power receptacle that employs any of the protection structures.

The protection structure employs a dual-layer structure, where the outer shell is a first protection layer that protects against high impact, high pressure water flow, and the sealing member with the first and second ribs form a second protection layer which is tightly waterproof to protect against water droplets, vapor and dust. The first protection layer protects the second protection layer from external impact and prevent it from being deformed, enhancing the overall protection effectiveness. The protection structure is easy to manufacture, low cost and easy to repair, and provide high waterproofness.

BRIEF DESCRIPTION OF THE DRAWINGS

Preferred embodiments of the present invention are described with reference to the drawings.

DETAILED DESCRIPTION OF PREFERRED EMBODIMENTS

Preferred embodiments of the present and their applications are described below. It should be understood that these descriptions describe embodiments of the present invention but do not limit the scope of the invention. When describing the various components, directional terms such as "up," "down," "left", "right", "top," "bottom" etc. are not absolute but are relative. These terms may correspond to the views in the various illustrations, and can change when the views or the relative positions of the components change.

Embodiments of the present invention provide a protection structure which has superior waterproof and dustproof properties, and is suitable for a variety of outdoor equipment, in particular, electrical equipment, such as outdoor power receptacles, outdoor meters, etc. The descriptions below use a power receptacle as an example, but the invention is not limited to power receptacles, and may be used in other equipment with high waterproof requirements.

Figure 1:
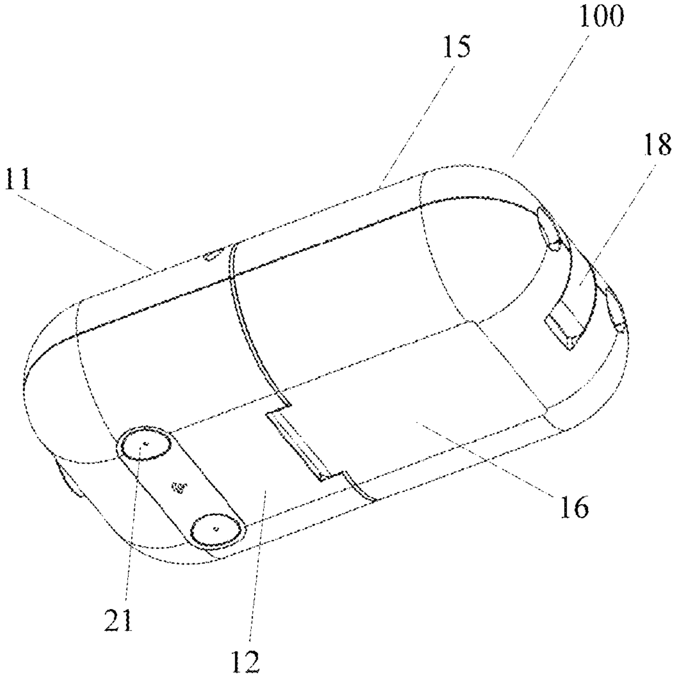
FIG. 1 is an exterior view of a power receptacle for outdoor use according to an embodiment of the present invention.
Figure 2:
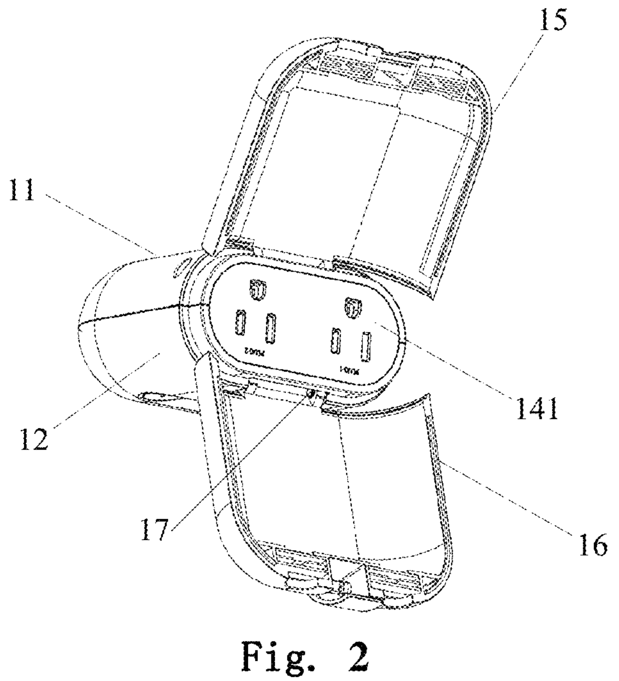
FIG. 2 shows the power receptacle of FIG. 1 being used.
Figure 3A:
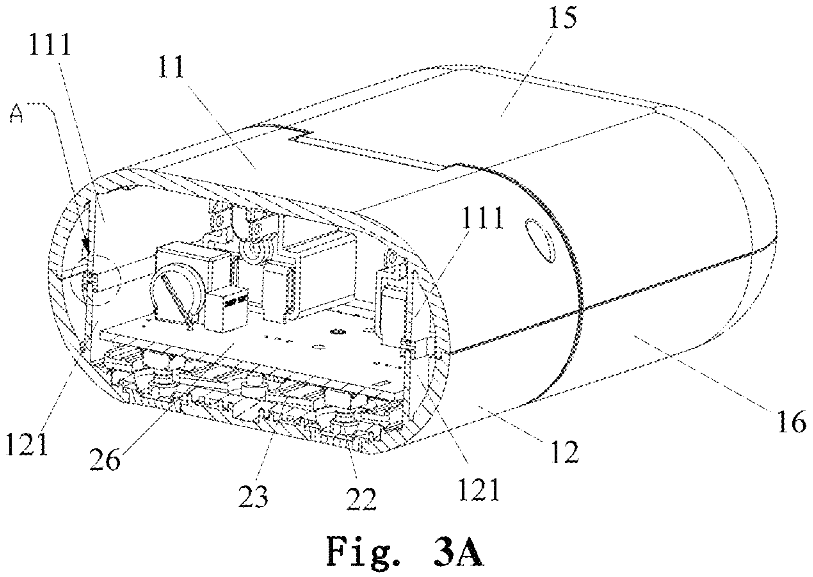
FIG. 3A is a partial cut-away view of the power receptacle of FIG. 1 cut along a transverse plane.
Figure 3B:
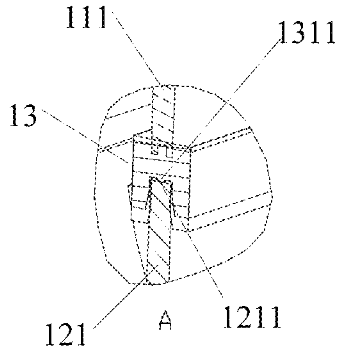
FIG. 3B is an enlarged view showing the structure of a portion A of the power receptacle of FIG. 3A.
Figure 4:
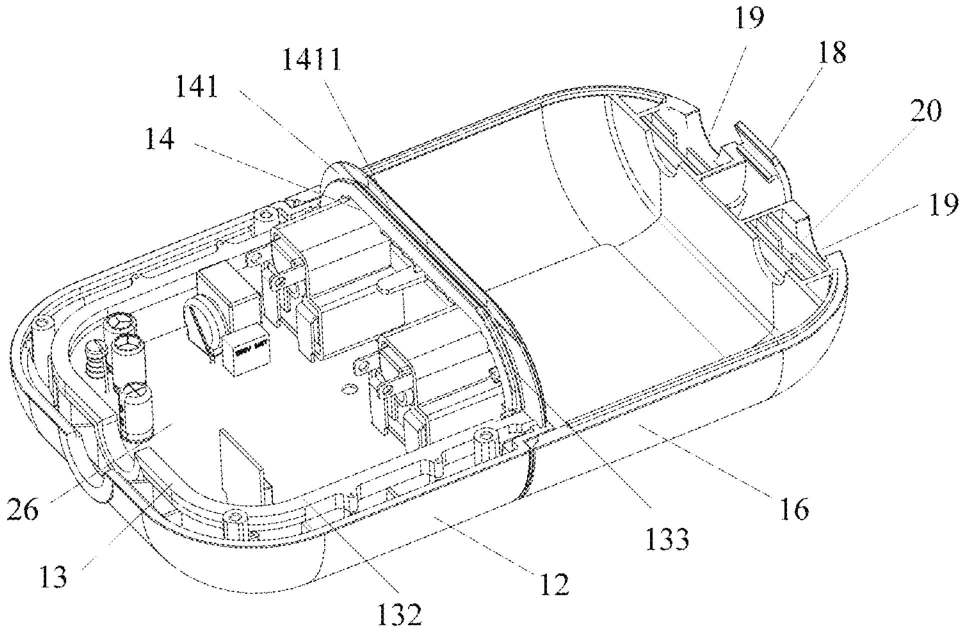
FIG. 4 illustrates the internal structures of the power receptacle of FIG. 1 with some cover parts removed.
Figure 5:
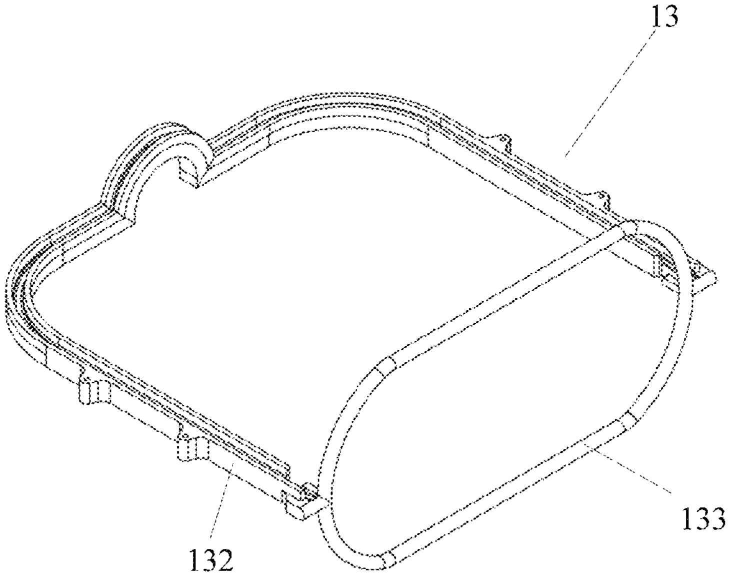
FIG. 5 illustrates the structure of a three-dimensional sealing member of the power receptacle of FIG. 1.
Figure 6:
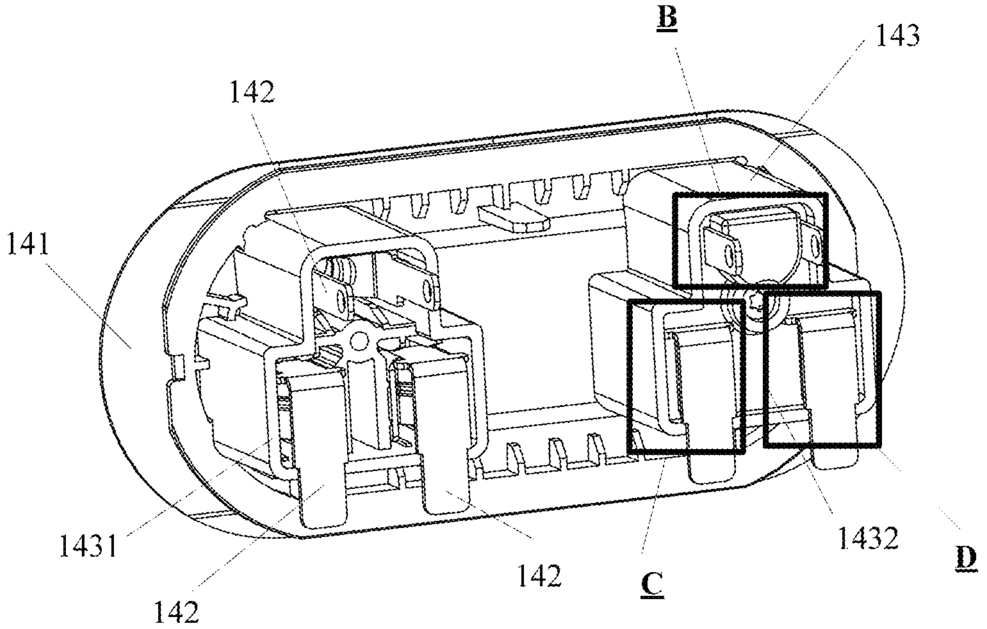
FIG. 6 illustrates a base assembly of the power receptacle of FIG. 1.
Figure 7:
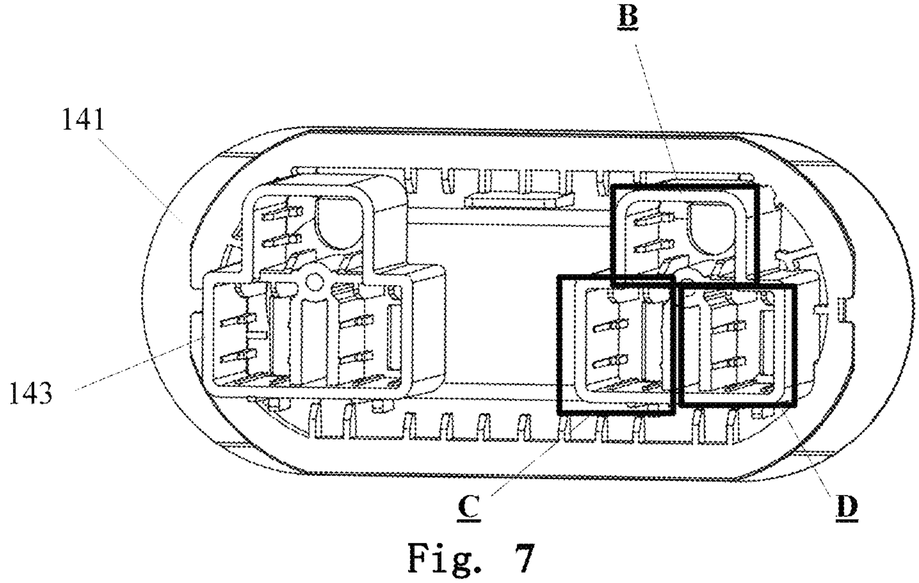
FIG. 7 is another illustration of the base assembly of the power receptacle of FIG. 1 with some parts removed.

FIGS. 1-7 illustrates an outdoor power receptacle with a protection structure according to embodiments of the present invention. FIG. 1 is an exterior view of the power receptacle. FIG. 2 shows the power receptacle being used (with the first and second flip covers 15 and 16 flipped open). FIG. 3A is a partial cut-away view of the power receptacle cut along a transverse plane through the first and second shells 11 and 12. FIG. 3B is an enlarged view showing the structure of a portion A of the power receptacle of FIG. 3A. FIG. 4 illustrates the internal structure of the power receptacle with the first shell and first flip cover removed. FIG. 5 illustrates the structure of a three-dimensional sealing member of the power receptacle. FIG. 6 illustrates a base assembly of the power receptacle of FIG. 1. FIG. 7 is another illustration of the base assembly of the power receptacle with some parts removed.

As shown in the figures, the power receptacle 100 includes an outer shell, which includes a first shell 11 and a second shell 12 connected together. The first shell 11 has a first rib 111 in its interior, and the second shell 12 has a second rib 121 in its interior, the first and second ribs respectively extending from an inner surface of the first and second shells toward each other. The power receptacle 100 further includes a sealing member 13, partially disposed between the first rib 111 and second rib 121 and connecting the two ribs in a waterproof manner. According to embodiments of the present invention, the protection structure is a dual-layer protection structure, where the outer shell is a first protection layer (outer protection layer), which can protect against high impact, high pressure water flow. The sealing member 13 and the first and second ribs 111, 121 form the second protection layer (inner protection layer), which is tightly waterproof, and can protect against seeping or drops of water, water vapor, and other small objects and prevent them from entering the interior protected space. Moreover, the first protection layer can protect the second protection layer from external impact and prevent it from being deformed, which enhance the overall protection effectiveness.

In preferred embodiments, the sealing member 13 is connected to the first rib 111 and/or second rib 121 by mating protrusions (protruding ridges) and grooves, which can effectively prevent deformation of the sealing member due to high compression, thereby preventing failure. More specifically, the sealing member 13 may be connected only to the first rib 111 by mating protrusions and grooves, or connected only to the second rib 121 by mating protrusions and grooves, or connected on both sides to both the first and second ribs 111, 121 by mating protrusions and grooves. For example, the sealing member 13 may have a protruding ridge, and correspondingly, the first rib 111 and/or second rib 121 have grooves cooperating with the protruding ridge. Or, the scaling member 13 may have a groove on one or both sides, and the first rib 111 and/or second rib 121 have protruding ridges cooperating with the grooves. The position, specific structures, and size of the protrusions and grooves may be chosen based on practical applications, and are not limited in this invention.

FIG. 3B is an enlarged view of a portion of the connection between the sealing member 13 and the first and second ribs 111, 121. In this example, the second rib 121 has a groove 1211, and the sealing member 13 has a protrusion (protruding ridge) 1311. The protrusion 1311 and groove 1211 run along the top of the first and second ribs 111, 121, and protrudes and recedes, respectively, in a direction perpendicular to the plane of the seal (which is the plane where the sealing member 13 lies). The groove 1211 and the protrusion 1311 engage with each other, which can prevent deformation of the sealing member due to high compression. In some embodiments, the protrusion 1311 has a curved cross-sectional shape, which is both easy to manufacture and enhances the sealing effect at the contact area with the groove.

The power receptacle 100 further includes a base assembly 14, which includes a main body 141 (also referred to as the third shell of the protection structure) and insertion contact plates 142 that receive inserted prongs of a plug. The main body 141 is connected to the first shell 11 and second shell 12 and together they form a sealed space (sec FIG. 2). As shown in FIG. 5, the sealing member 13 is a three-dimensional seal, including a first sealing portion 132 and a second sealing portion 133 joined to each other as one piece. The sealing member 13 is three-dimensional in that the first sealing portion 132 lies in a first plane and the second scaling portion 133 lies in a second plane which is non-coplanar with the first plane. The first scaling portion 132 connects the first shell 11 and second shell 12 (via first rib 111 and second rib 121) in a waterproof manner; the second sealing portion 133 connects the first shell 11 and the base assembly main body 141 in a waterproof manner, and also connects the second shell 12 and the base assembly main body 141 in a waterproof manner, as described in detail below with reference to FIGS. 4 and 4A-4F.

Figure 4A:
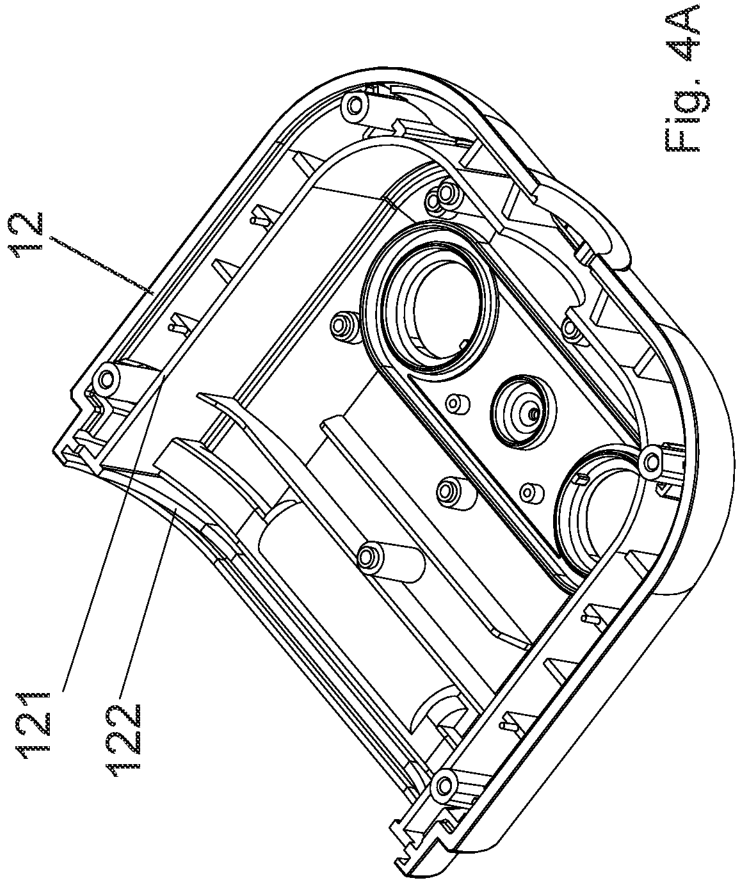
FIGS. 4A-4F illustrate a power receptacle according to embodiments of the present invention, showing structures that form a seal between first and third, and second and third shells of the power receptacle.
Figure 4B:
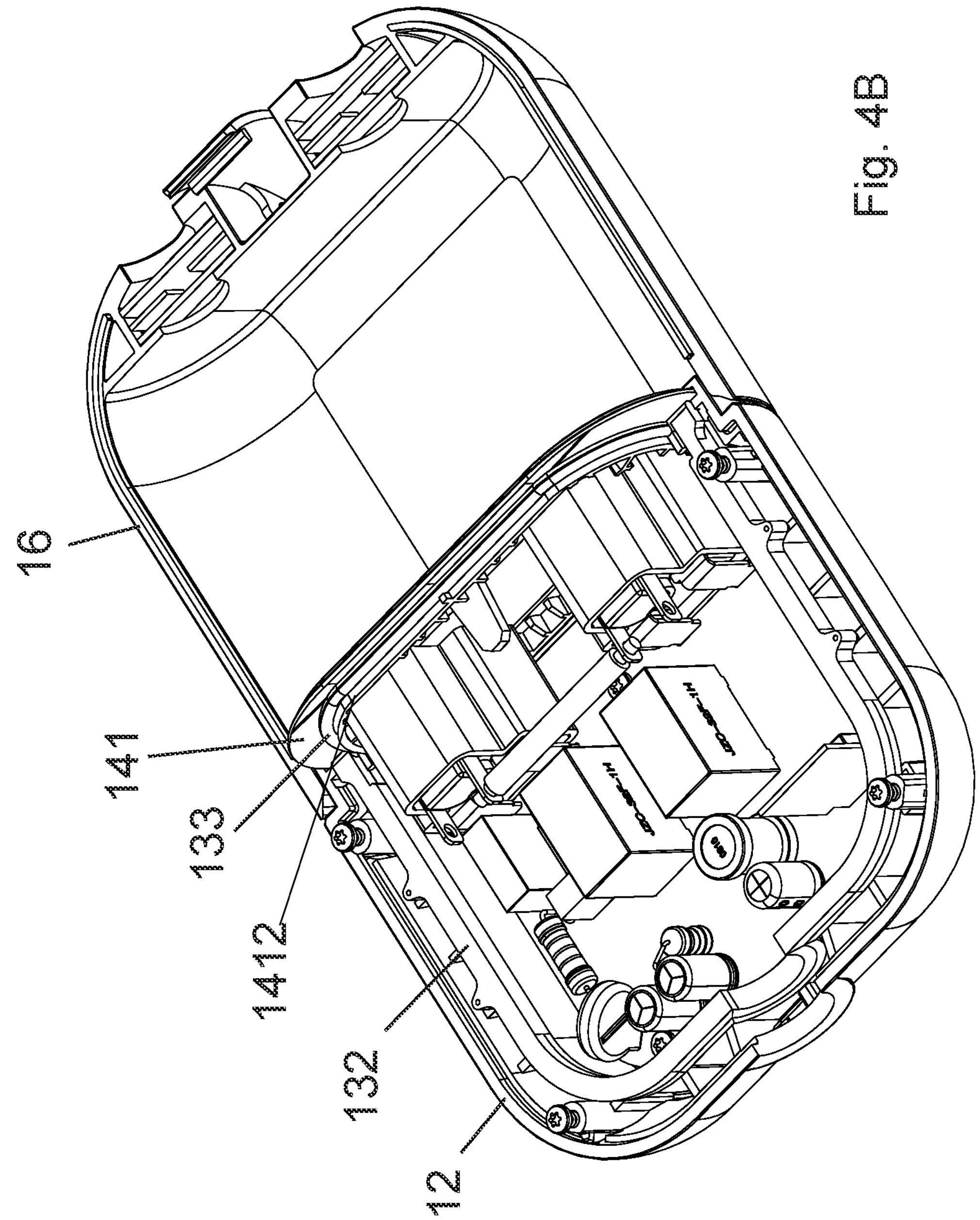
Figure 4C:
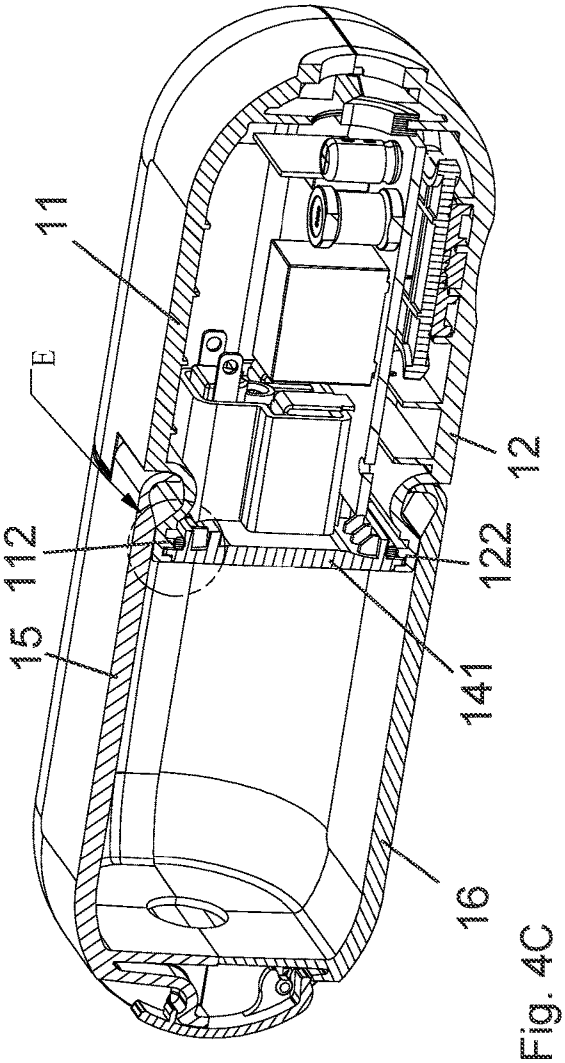
Figure 4D:
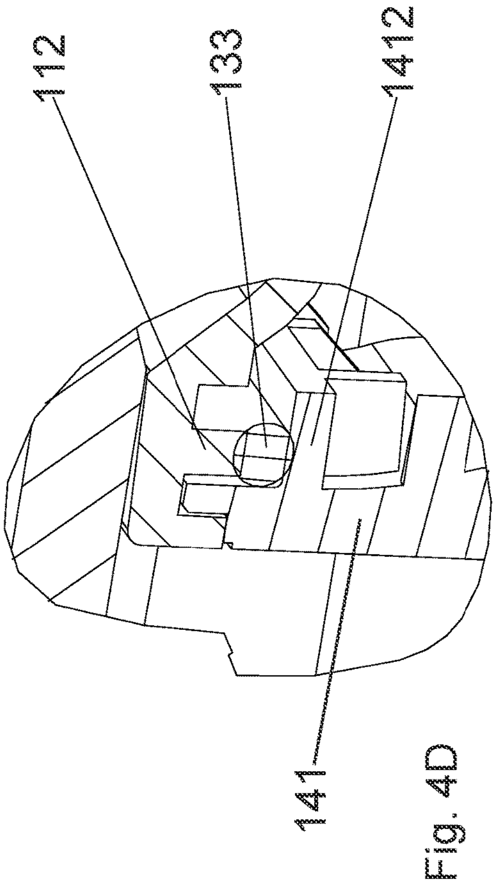
Figure 4E:
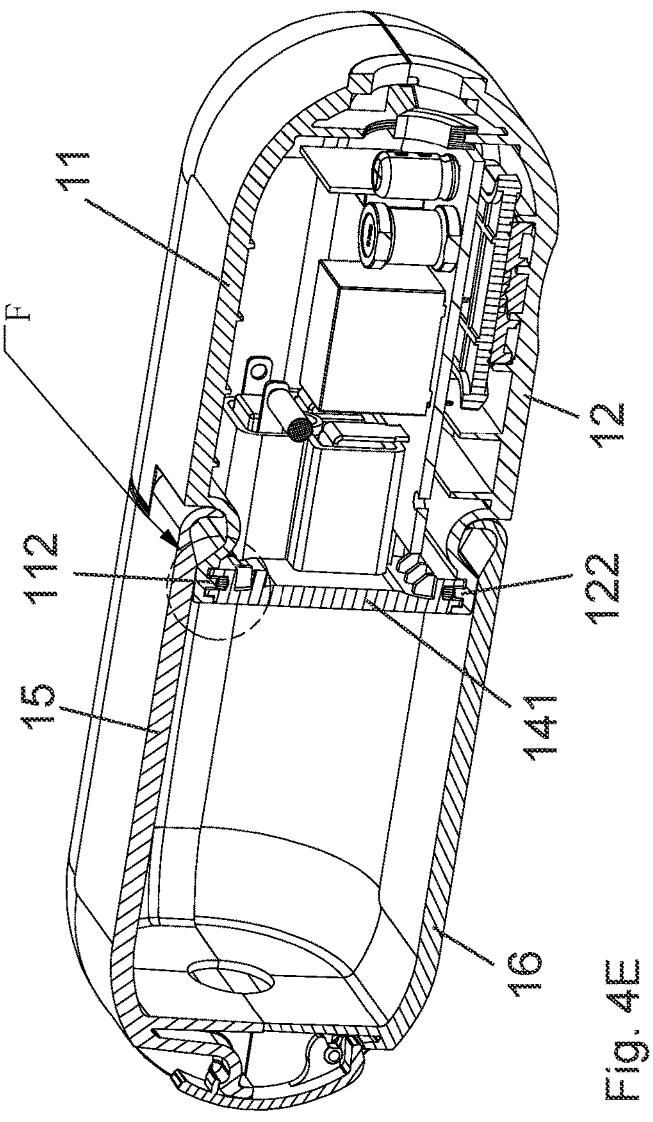
Figure 4F:
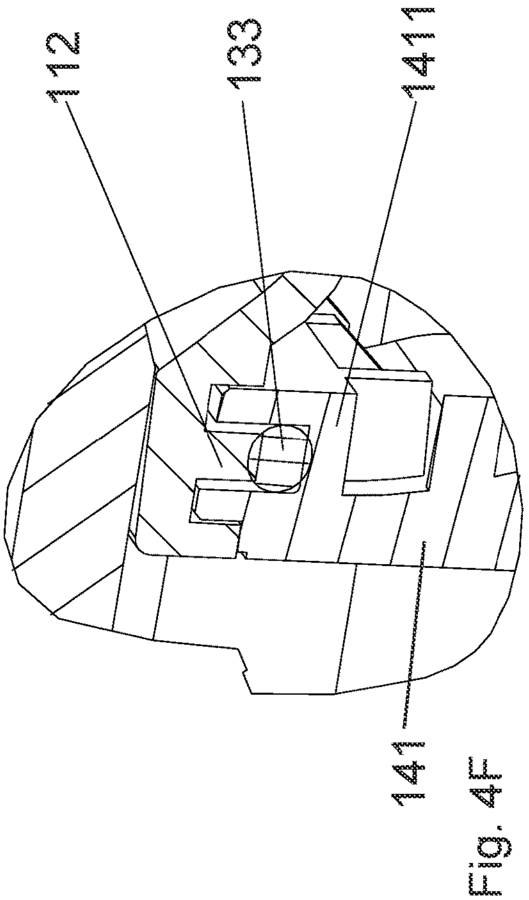

FIG. 4A is a perspective view of the power receptacle showing an interior of the second shell 12 without the sealing member 13 installed. FIG. 4B is a perspective view showing an interior of the second shell 12, the base assembly 14 and the second flip cover 16, with the scaling member 13 installed. FIG. 4C is cut-away view of one embodiment of the power receptacle, cut along a vertical longitudinal plane through each of the first shell 11, second shell 12, main body 141, first flip cover 15 and second flip cover 16. FIG. 4D is an enlarged view showing the structure of a portion E of FIG. 4C. FIG. 4E is cut-away view of another embodiment of the power receptacle, cut along a vertical longitudinal plane similar to FIG. 4C. FIG. 4F is an enlarged view showing the structure of a portion F of FIG. 4E.

As shown in FIGS. 4A and 4C, the first shell 11 has a third rib 112 and the second shell 12 has a fourth rib 122, both located on the inside of the shells near the base assembly main body 141 and protruding toward the interior of the sealed space. As shown in FIG. 4A, the rims of the third and fourth ribs 112 and 122 together form an oval shape that matches the shape of the outer periphery of the second sealing portion 133 of the sealing member 13 (FIG. 4A only shows the second shell 12 with the fourth rib 122 forming a half of the oval, but the third rib 112 of the first shell 11 has a similar structure and forms the other half of the oval). In one embodiment, shown in FIGS. 4B, 4C and 4D, the base assembly main body 141 has a fifth rib 1412 protruding on its inside toward the interior of the sealed space; the fifth rib 1412 has an oval shape that matches the shape of the inner periphery of the second sealing portion 133 of the sealing member 13. As shown in the cross-sectional views in FIGS. 4C and 4D, the second sealing portion 133 is pressed between the fifth rib 1412 and the third/fourth rib 112/122 to achieve secure waterproofness (the pressure being in the vertical direction in FIG. 4D).

In an alternative embodiment, shown in FIGS. 4E and 4F as well as FIG. 4, the fifth rib 1411 is one that has a groove around it facing sideways and outwardly (up in the orientation of FIG. 4F) to accommodate the second sealing portion 133. The second sealing portion 133 is inserted into the groove of the fifth rib 1411, and is sealed with pressure between the groove 1411 and the third/fourth ribs 112/122 of the first shell 11 and second shell 12, to achieve secure waterproofness. In these embodiments, the connection locations between the base assembly main body 141 and the first and second shells 11, 12 are sealed by the second sealing portion 133 pressed between the fifth rib 1412 or 1411 and the third/fourth ribs 112/122 of the first and second shells 11 and 12, to achieve secure waterproofness.

In embodiments of the present invention, the three-dimensional sealing member is used. Compared to O-shaped or rectangular shaped two-dimensional seals in conventional structures, the three-dimensional sealing member can achieve continuity of the sealing layer, and is easy to assemble. This can reduce mistakes in assembling and save assembling time. It can also avoid problems that arise when multiple sealing rings are used, where the problems can be caused by low precision of parts and can result in lost of waterproofness. The illustrated embodiment shows U-shaped first sealing portion 132 and a continuous-ring second sealing portion 133, together forming the three-dimensional sealing member 13; however, the shape of the sealing member 13, the number of sealing portions of the sealing member, and the relative angles of the scaling portions may be adjusted depending on the shape of the other components of the protection structure. For example, the plane of the first sealing portion 132 and the plane of the second sealing portion 133 may be perpendicular to each other, or may form another angle such as 45 degrees or 60 degrees. The sealing member 13 may further include a third sealing portion and a fourth sealing portion, all joined together in one piece. Each scaling portion may be a V shape, a U shape, an O shape, a rectangular shape, a Y shape, etc.

The power receptacle 100 further includes electrical conducting parts such as the one or more sets of insertion contact plates 142, for forming electrical connection with the external electrical appliance via a plug. The main body 141 has corresponding insertion holes, such as three holes (per set) in the illustrated embodiment. It should be noted that the power receptacle may also be a two-hole receptacle, an USB receptacle, other types of receptacles, or combination receptacles.

In preferred embodiments, the main body 141 has one or more partition structures 143 (one for each set of insertion contact plates), where each partition structure 143 forms insertion contact plate cavities to separate the multiple insertion contact plates in each set. More specifically, each partition structure 143 includes a separation structure 1431 and a partition sealing structure 1432. The separation structure 1431 forms multiple separate cavities to separate the multiple insertion contact plates of the set. The partition sealing structure 1432 seals the cavities formed by the separation structure 1431, such as by using a press plate and a sealing gel. At the front end, the partition structure 143 separates the hot, neutral, and ground insertion contact plates from each other, so that any water that enters from the front will not cause short circuits between the hot and neutral insertion contact plates. At the back end, the press plate sealing prevents water from entering the space where electrical circuits are located, to protect the circuits. As shown in FIGS. 6 and 7, the separation structure 1431 partitions the overall space of the insertion contact plates into three mutually separated cavities B, C and D. The partition structure 143 isolates the N insertion contact plates (for the neutral line), the L insertion contact plates (for the hot line), and the ground insertion contact plates from each other, which can prevent short circuits caused by any water entering the receptacle when the user plugs or unplugs an electrical plug, thereby preventing electrical shock to the user. In some embodiments, when no ground plates are provided, the separation structure 1431 only forms separate cavities to isolate the hot and neutral insertion contact plates from each other to prevent short circuits because them. It should be mentioned that the partition structure 143 is applicable to not only power receptacles with insertion contact plates, but also any electrical appliances that have electrical contact parts when there is a risk of short circuits caused by water intrusion. For these electrical appliances, the same principle described above can be applied, i.e., to form separate cavities for the electrical contact parts, and to seal the respective cavities to achieve waterproof and dustproof protection.

The power receptacle 100 according to embodiments of the present invention further includes a first flip cover 15 and a second flip cover 16, respectively connected to the first shell 11 and the second shell 12, for example, in a rotatable manner by pins or hinges. When closed, the first and second flip covers 15, 16 cover the main body 141 and the insertion holes. In one example, the first flip cover 15 and second flip cover 16 is respectively connected to the first shell 11 and the second shell 12 by knurled pin connectors 17. The knurls on the pin connectors 17 increase the friction at the connection contact, which helps to prevent the pin connectors 17 (e.g., the pins) from falling off, and also provide a damping effect for the flip covers so that the flip covers can stay at any position. The knurling structure is easy to manufacture and low cost.

In some embodiment, the first flip cover 15 and second flip cover 16 are connected to each other by a snap 18. When closed, the first flip cover 15 and second flip cover 16 form one or more cable holes 19 for cables of the plug to pass through. Each cable hole 19 is provided with a two-piece waterproof plug made of a silica gel, one piece located on the first flip cover 15 and one piece located on the second flip cover 16. To use the power receptacle 100, the snap 18 is unsnapped and the first and second flip covers 15, 16 are flipped open to expose the main body 141 and the plug holes of the base assembly 14. After the plug is plugged into the base assembly 14, the first and second flip covers 15 and 16 are closed, with the cable of the plug passing through the cable hole 19 to the outside, and the snap 18 is snapped close. In the illustrated embodiment, the base assembly 14 along with the first and second shells 11, 12 form a first protection cavity, and the first and second flip covers 15, 16 along with the base assembly 14 form a second protection cavity. The first protection cavity accommodates components of the power receptacle such as circuit board assembly 26, insertion contact plates 142, etc.

In some embodiments, push button switches 21 (e.g., power on/off switch, Wi-Fi on/off switch, indicator light on/off switch, etc.) are provided on the second shell 12. A silica gel button pad 22 is provided below each push button 21, with a silica gel press plate 23 pressing on the silica gel button pads and tightened by screws, to achieve a waterproof seal for the buttons. In some embodiments, the first shell 11, second shell 12, first flip cover 15 and second flip cover 16 together form the outer shell of the power receptacle 100. The overall shape of the outer shell has curved and smooth corners to enhance user experience.

While the present invention is described above using specific examples, these examples are only illustrative and do not limit the scope of the invention. It will be apparent to those skilled in the art that various modifications, additions and deletions can be made to the protection structure for power receptacle of the present invention without departing from the spirit or scope of the invention.

What is claimed is:

1. A waterproof protection structure, comprising:
- an outer shell, including a first shell and a second shell connected to each other, wherein the first shell includes a first rib disposed on its inside, and the second shell includes a second rib disposed on its inside;
- a sealing member, disposed between the first rib and the second rib, configured to form a waterproof seal between the first rib and the second rib; and
- a third shell, connected to the first shell and the second shell to form a sealed space, wherein the third shell includes a fifth rib disposed on its inside;
- wherein the first shell further includes a third rib disposed on its inside near the third shell, and the second shell further includes a fourth rib disposed on its inside near the third shell,
- wherein the sealing member is a three-dimensional structure which includes a first sealing portion and a second sealing portion, wherein the first sealing portion connects the first rib and the second rib in a waterproof connection, the second sealing portion connects the third rib of the first shell and the fifth rib of the third shell in a waterproof connection, and the second sealing portion further connects the fourth rib of the second shell and the fifth rib of the third shell in a waterproof connection.

2. The protection structure of claim 1, wherein the sealing member is connected to the first rib and/or second rib by mating protruding ridges and grooves.

3. The protection structure of claim 1, further comprising an electrical device disposed within the sealed space;
- wherein the electrical device includes a plurality of electrical conductors for forming electrical connection with an external electrical appliance,
- wherein the third shell includes a partition structure configured to separate the plurality of electrical conductors from each other.

4. The protection structure of claim 3, wherein the partition structure includes a separation structure and a partition sealing structure, wherein the separation structure forms a plurality of mutually separated cavities, and the partition sealing structure seals the plurality of cavities formed by the separation structure.

5. The protection structure of claim 3, wherein the electrical device is a power receptacle and the plurality of electrical conductors are a plurality of insertion contact plates configured to receive prongs of a plug, and wherein the partition structure is configured to separate the plurality of insertion contact plates from each other.

6. The protection structure of claim 3, further comprising:
- a first flip cover connected to the first shell by a first pin connector; and
- a second flip cover connected to the second shell by a second pin connector.

7. The protection structure of claim 6, wherein the first pin connector and the second pin connector respectively include first and second knurled pins.

8. The protection structure of claim 1, further comprising:
- at least one push button switch disposed on the outer shell;
- a silica gel button pad disposed below the push button switch; and
- a silica gel press plate pressing on the silica gel button pad and tightened by screws to form a waterproof seal for the push button switch.

9. The protection structure of claim 1, wherein the first sealing portion of the sealing member is pressed between the first rib of the first shell and the second rib of the second shell, a part of the second sealing portion of the sealing member is pressed between the third rib of the first shell and the fifth rib of the third shell, and another part of the second sealing portion of the sealing member is pressed between the fourth rib of the second shell and the fifth rib of the third shell.

10. The protection structure of claim 1, wherein the fifth rib includes a groove around it facing sideways and outwardly, wherein the second sealing portion is disposed within the groove.

11. A power receptacle comprising the protection structure of claim 1.

* * * * *